United States Patent [19]

Gelfman

[11] Patent Number: 4,880,182
[45] Date of Patent: * Nov. 14, 1989

[54] CABLE REEL

[76] Inventor: Stanley Gelfman, 491 High Cliffe La., Tarrytown, N.Y. 10591

[*] Notice: The portion of the term of this patent subsequent to Jan. 10, 2006 has been disclaimed.

[21] Appl. No.: 294,184

[22] Filed: Jan. 6, 1988

Related U.S. Application Data

[63] Continuation-in-part of Ser. No. 173,288, Mar. 25, 1988, Pat. No. 4,796,830.

[51] Int. Cl.$^4$ ............................................. B65H 75/12
[52] U.S. Cl. ................................. 242/117; 242/118.4; 242/125.1
[58] Field of Search .................... 242/117, 118.4, 77, 242/77.3, 125.1, 125.2, 125; 141/12.2 R

[56] References Cited

U.S. PATENT DOCUMENTS

| | | | |
|---|---|---|---|
| 2,846,162 | 8/1958 | Allin, Sr. et al. | 242/117 |
| 4,387,863 | 6/1983 | Edmonston et al. | 242/118.4 |
| 4,451,013 | 5/1984 | Bedrosian | 242/118.4 |
| 4,657,140 | 4/1987 | Zagar et al. | 242/118.4 X |

Primary Examiner—Joseph J. Hail, III
Assistant Examiner—Steven M. duBois
Attorney, Agent, or Firm—Kenyon & Kenyon

[57] ABSTRACT

A cable reel is disclosed comprising a first cylindrical member about which cable can be wound having a longitudinal axis and a hollow interior, first and second flanges disposed at opposite ends of the cylindrical member substantially at right angles to the longitudinal axis of the cylindridcal member, one of the flanges having an outside surface having at least one opening arranged adjacent the periphery of the one flange through which the cable can be traversed and a second opening in the surface disposed adjacent the center of the one flange and opening into the hollow interior of the cylindrical member, the hollow interior adapted to receive ends of the cable wound on the cylindrical member, at least one end being received through the second opening, and further comprising a plate attached to the one flange forming a wall disposed adjacent and parallel to the outside surface of the one flange and at a spacing from the surface of the one flange equal to at least approximately the thickness of the cable, for receiving the cable between the surface and the wall, thereby protecting the cable extending between the first and second openings. An opening is also provided in the cylindrical member opening into the hollow interior for allowing one end of the cable optionally to be received through the opening of the cylindrical member into the hollow interior, thereby preventing the one end from interfering with the winding process.

42 Claims, 5 Drawing Sheets

CABLE REEL

REFERENCE TO RELATED APPLICATION

This application is a continuation-in-part of copending U.S. patent application Ser No. 173,288, now U.S. Pat. No. 4,796,830 for Cable Reel, filed Mar. 25, 1988 in the name of Stanley Gelfman.

BACKGROUND OF THE INVENTION

The present invention relates to cable or wire reels, and in particular to a reel for the storage, transportation and protection of cable and associated connectors, for example, electrical or communication cable, and in particular, for the storage, transportation and protection of fiber optic communication cable.

Electrical or communication cable has customarily been wound on cable reels comprising a cylindrical drum having flanges on opposite ends of the drum. According to one design, for the storage and transportation of electrical or 16 communication cable, the reel comprises a central drum portion having a single flange at one end of the drum portion and at the other end of the drum portion, a double flange comprising an inner and an outer flange portion having a number of axially extending connecting dowels disposed between the inner and outer flange portions of the double flange. The inner flange portion of the double flange is slotted and thus split into two sections, so that the cable can be fed through the slot and the cable end connectors disposed in the volume between the two flange portions. The two flange portions thus protect the end connectors of the cable from damage when the ends are located in the volume therebetween, and the connecting dowels between the two flange portions serve to retain the cable end connectors within this volume.

Typically, the cable wound on the above described known cable reels has been of the metallic conductor type, generally copper or aluminum. For the storage and transportation of copper cable, the cable reels utilized in the past have been relatively heavy, due to the great weight of copper cable. Furthermore, the provision of a double flange at one end of the cylindrical drum of the known cable reels is inefficient, since for the most part the volume contained within the two flange portions is wasted space and the connectors are exposed to the external environment.

With the advent of fiber optic communications cable, which cable is approximately one-sixth the weight of copper cable and at the same time can transmit many times the number of messages, it is unnecessary to provide the same heavy massive reels utilized for the storage of copper cable. Indeed, with the need for high speed air deployment of communication equipment today, the weight factor of a fiber optic cable reel should be more compatible with the light weight of the fiber optic cable itself. Furthermore, it seems unnecessary to provide a double flange at one end of the cable reel simply for the storage of the cable end connectors fastened to the ends of the cable. It is important that the cable end connectors be accessible, however, because it is often necessary in the field that a particular section of cable wound on a cable reel be tested for continuity prior to laying the cable out to form a communications line. Thus, any practical cable reel, especially a fiber optic cable reel, must not only provide protection for the connector ends of the cable, but must also allow those connector ends to be accessible while the cable is wound on the reel for continuity testing purposes.

SUMMARY OF THE INVENTION

Accordingly, it is an object of the present invention to provide a more space-efficient, lightweight cable reel.

It is still yet a further object of the present invention to provide such a cable reel which is useful for the storage, transportation and protection of electrical or communications cable.

It is yet still a further object of the present invention to provide such a cable reel which is especially suited to the storage, transportation and protection of fiber optic communication cable.

It is still yet a further object of the present invention to provide such a cable reel which eliminates the double flange utilized on many cable reels known heretofore, but yet at the same time, provides a convenient way to store and protect the cable connector ends, including connectors, if such connectors are attached to the ends of the cable, while still maintaining the accessibility of these ends for testing purposes.

It is yet still a further object of the present invention to provide a new cable reel which is easily transported and stored.

It is still yet a further object of the present invention to provide a cable reel which is particularly suited to the storage and protection of fiber optic communications cable, taking into account the necessary specifications for such cable, such as minimum bending radii of curvature.

It is yet another object of the present invention to provide a cable reel which is compatible with conventional cable winding equipment.

It is yet still a further object of the present invention to provide a cable reel which is substantially nondeformable.

It is yet still another object of the present invention to provide a cable reel which insures adequate protection of the cable stored thereon.

It is another object of the present invention to provide a cable reel which insures superior connector protection against damage and the effects of the external environment.

It is yet still a further object of the present invention to provide a cable reel which can be used for the storage, transportation and protection also of conventional metal cable.

The above and other objects of the present invention are achieved by a cable reel comprising a first cylindrical member about which cable can be wound having a longitudinal axis and a hollow interior, first and second flanges disposed at opposite ends of the cylindrical member substantially at right angles to the longitudinal axis of the cylindrical member, one of the flanges having an outside surface having at least one opening arranged adjacent the periphery of the one flange through which the cable can be traversed and a second opening in the surface disposed adjacent the center of the one flange and opening into the hollow interior of the cylindrical member, the hollow interior adapted to receive ends of the cable wound on the cylindrical member, at least one end being received through the second opening, and further comprising means disposed on the outside surface for protecting the cable extending between the first opening and the second opening.

The above and other objects of the present invention are further achieved by a cable reel comprising a first cylindrical member about which cable can be wound having a longitudinal axis and a hollow interior, first and second flanges disposed at opposite ends of the cylindrical member substantially at right angles to the longitudinal axis of the cylindrical member, one of the flanges having an outside surface having at least one opening arranged adjacent the periphery of the one flange through which the cable can be traversed and a second opening in the surface disposed adjacent the center of the one flange and opening into the hollow interior of the cylindrical member, the hollow interior adapted to receive ends of the cable wound on the cylindrical member through the second opening, and further comprising means attached to the one flange having a wall disposed adjacent and parallel to the outside surface of the one flange and at a spacing from the surface of the one flange equal to at least approximately the thickness of the cable, for receiving the cable between the surface and the wall, thereby protecting the cable extending between the first and second openings.

The above and other objects of the present invention are additionally achieved by a cable reel comprising a first cylindrical member about which cable can be wound having a longitudinal axis and a hollow interior, first and second flanges disposed at opposite ends of the cylindrical member substantially at right angles to the longitudinal axis of the cylindrical member, one of the flanges having an outside surface having at least one opening arranged adjacent the periphery of the one flange through which the cable can be traversed and a second opening in the surface disposed adjacent the center of the one flange and opening into the hollow interior of the cylindrical member, the hollow interior adapted to receive ends of the cable wound on the cylindrical member, at least one end being received through the second opening, and further comprising means attached to the one flange having a wall disposed adjacent and parallel to the outside surface of the one flange and at a spacing from the surface of the one flange equal to at least approximately the thickness of the cable, for receiving the cable between the surface and the wall, thereby protecting the cable extending between the first and second openings, the cylindrical member further having an opening disposed therein opening into the hollow interior for allowing one end of the cable to be received through the opening of the cylindrical member into the hollow interior.

Other objects, features and advantages of the present invention will be apparent from the detailed description which follows.

BRIEF DESCRIPTION OF THE DRAWINGS

The invention will be described in greater detail in the following detailed description with reference to the drawings, in which.

DETAILED DESCRIPTION

Figure 1:
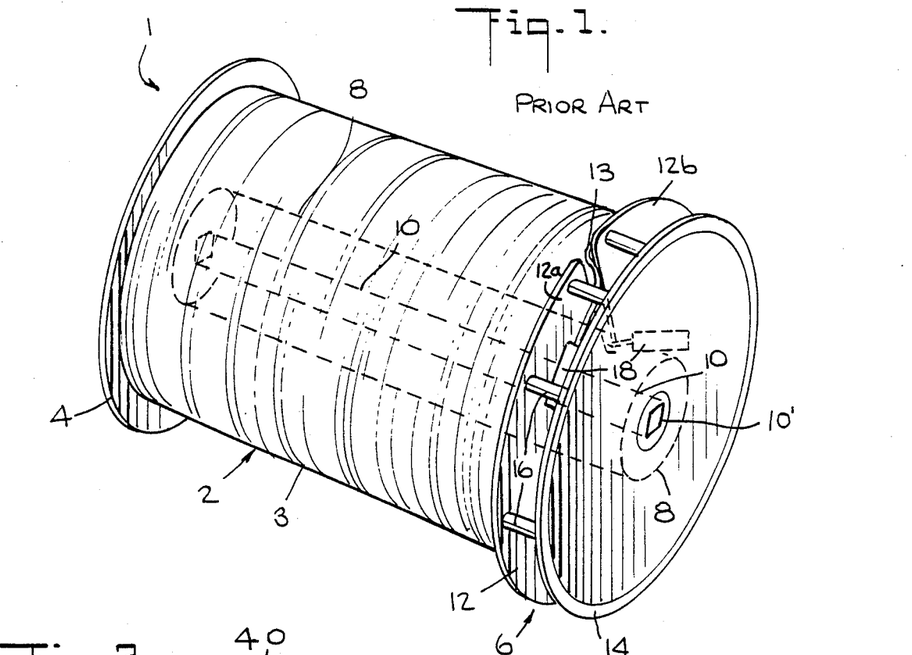
FIG. 1 is a perspective view of a prior art cable reel, and in particular of a prior art cable reel which has been used for the storage of copper cable and which has also been proposed for the storage of fiber optic cable.

With reference now to the drawings, FIG. 1 shows a known cable reel indicated generally at 1 which has heretofore been used for the storage of copper cable. The cable reel 1 includes a central drum member 2 having cable 3 wound thereon and flanges 4 and 6 disposed at opposite ends of the drum member 2. Drum member 2 comprises a first outer cylindrical member 8 and a second inner cylindrical member 10. Flange 6 typically comprises a pair of members 12 and 14 disposed spaced from each other, thus defining a volume therebetween. Cylindrical members 8 and 10, flange 4 and flange members 12 and 14 typically are made of sheet metal, the flanges having suitable beads for stiffening purposes. Cylindrical members 8 and 10 terminate at flange 4 and flange member 14, with inner flange member 12 of flange 6 being suitably fastened to outer drum member 8. Inner cylindrical member 10 typically has a square opening 10' at the point where it opens into flange 14 so as to accept the spindle of automatic cable winding equipment. Flange member 12 typically is subdivided into two semicircular portions 12a and 12b thus defining a slot 13 for the passage of the cable 3, and flange portions 12a and 12b are coupled to flange member 14 via a plurality of connecting dowels 16.

The purpose of double flange 6 is as follows. When a cable is to be wound on a cable reel, typically by automatic cable winding equipment, a first of the end connections 18 of the cable is disposed within the volume between the two flange members 12 and 14. The cable 3 is then arranged so as to traverse the slot 13 between the two flange portions 12a and 12b and is then wound on the drum member 2 of the cable reel. Upon reaching the end of the cable, the cable is then again slipped through the slot 13 between the flange portions 12a and 12b, and the remaining end connector disposed in the volume between the flange members 12 and 14. The connecting dowels 16 between flange members 12 and 14 provide not only a convenient means for holding the two flange members in alignment, but also provide a means for retaining the end connections 18 of the cable within the volume between the flange members 12 and 14, thus protecting the cable ends.

Although the known cable reel serves its intended purpose, it is deficient in a number of respects. First of all, it is primarily intended for the storage of copper cable, and thus is unnecessarily heavy. Second, the double flange 6 comprising flange members 12 and 14 at one end of the cable reel is inefficient, as it both wastes space and weight. The space wasted for the storage of the cable end connections 18 could be put to much better use if cable could be wound there or the space simply eliminated. This inefficiency is especially noticeable when large numbers of cable reels are stacked together, the wasted space approaching approximately 20–25% of the storage volume. Additionally, the double flange 6 does not always provide adequate protection for the cable ends 18, since the ends can escape from the volume between the flange members 12 and 14 by protruding between dowels 16. Furthermore, the known cable reel is expensive to make, as it requires heavier materials and greater quantities of such materials. In addition, the known cable reel has been made of a sheet metal material, which is easily deformed upon impact, often making it difficult to unwind a cable from the reel.

Figure 2:
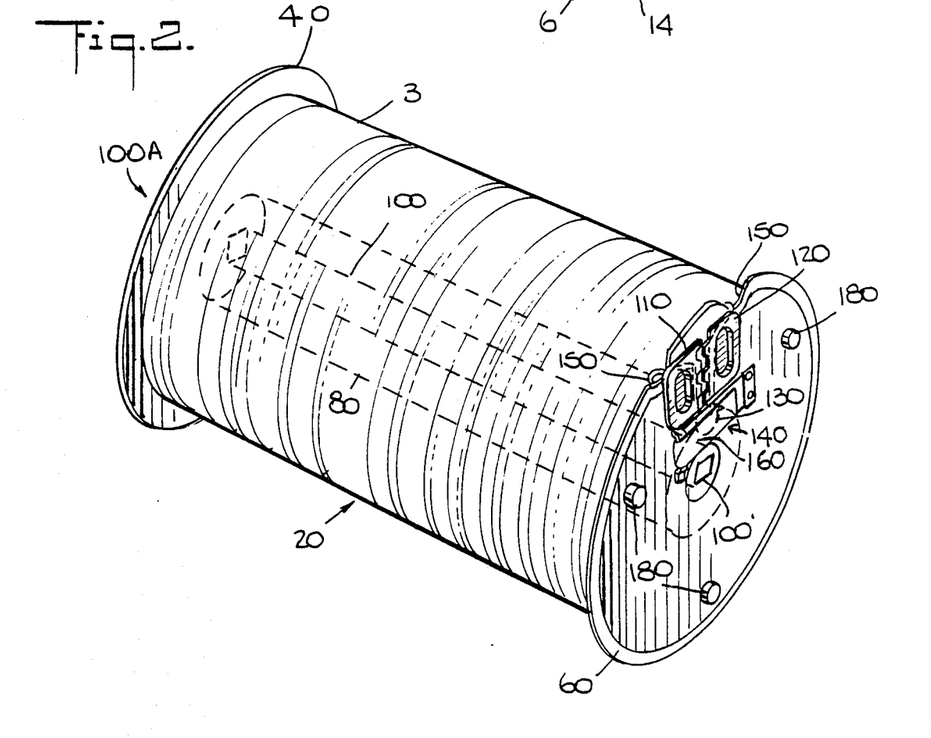
FIG. 2 is a perspective view of one embodiment of the cable reel according to the present invention.

FIG. 2 is a perspective view of the cable reel 100A according to the present invention which is more space and weight efficient, is nondeformable, is cheaper to make and provides more protection for the cable than the cable reel shown in FIG. 1 and is particularly adapted to the storage of fiber optic cable and otherwise solves the drawbacks of the known cable reel.

The cable reel 100A according to the invention includes a central drum member 20 around which cable 3 is wound, comprising an outer cylindrical member 80 and an inner cylindrical member 100. Cylindrical members 80 and 100 are coupled to respective flanges 40 and 60 disposed at opposite ends thereof. Inner cylindrical member 100 has a square opening 100, to accept the spindle of automatic cable winding equipment. Preferably, flanges 40 and 60 may comprise a spring type metal material so that upon impact, these portions will deflect, but will not substantially deform. For example, a 1050 steel may be utilized. The cable reel according to the invention can also be made of another suitable material, such as a nondeformable plastic. Of course, the flanges may be made of a non-spring type metal which would allow for some minimum allowable deformation within accepted specifications.

Figure 3:
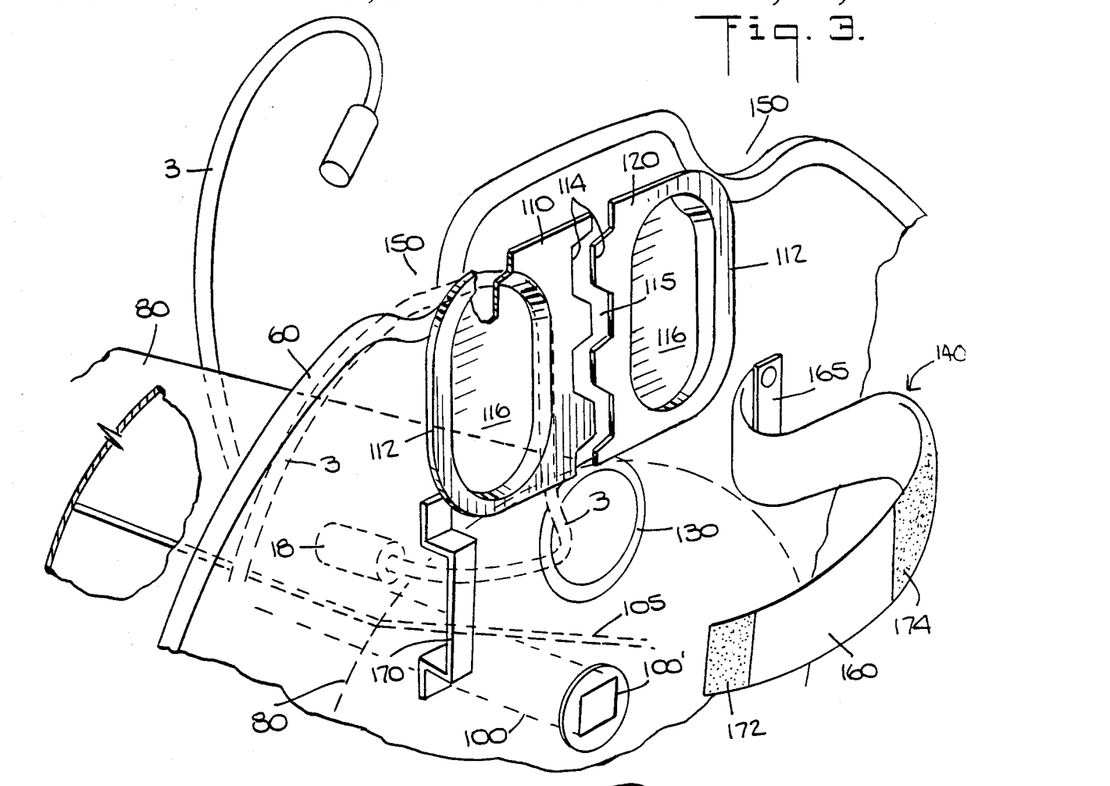
FIG. 3 is a detailed perspective view of a portion of the cable reel shown in FIG. 2.

As shown in FIG. 2, flange 60 has mounted thereto a pair of plate members 110 and 120, which are shown in greater detail in FIG. 3. Furthermore, below the plate members 110 and 120, an aperture 130 is disposed in flange 60 for providing access to the hollow interior between cylindrical members 80 and 100 so that the hollow interior can receive ends of the cable wound on the cable reel, as will be explained in greater detail below. A protective member 140 is disposed over the aperture 130. The purpose of protective member 140 will be explained in greater detail below. In addition, flange 60 includes two cut-outs 150 through which the cable wound on the reel traverses.

Figure 4:
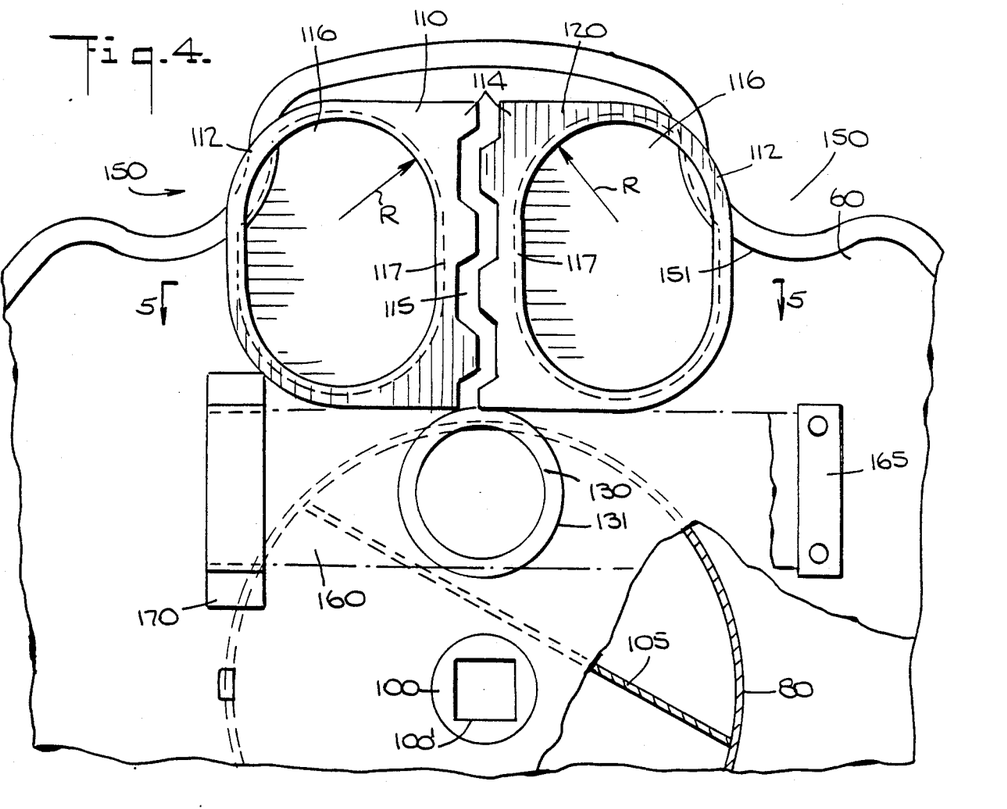
FIG. 4 is a front elevational view of a portion of the cable reel shown in FIG. 2.

With reference now to FIGS. 3 and 4, the plate members 110 and 120 disposed on flange 60 are shown in greater detail. As shown in FIG. 3 and in FIG. 4, plate members 110 and 120 preferably comprise two identical plates having a rounded edge 112 and a zig-zag edge 114. Plates 110 and 120 are identical except that one plate is rotated 180° with respect to the other plate so that the zig-zag sections interleave to form a zig-zag slot 115 as shown best in the elevational view of FIG. 4. The zig-zag slot allows the cable to be inserted into the area under the slot, but due to the natural straightening tendency of the cable, the cable will not of and by itself eject itself from the slot. Plates 110 and 120 have a recessed central portion 116, which is suitably fastened to the outside surface of flange 60. The recessed central portion 116 may be fastened to flange 60 by spot welds or suitable fastening means such as screws or rivets.

Figure 5:
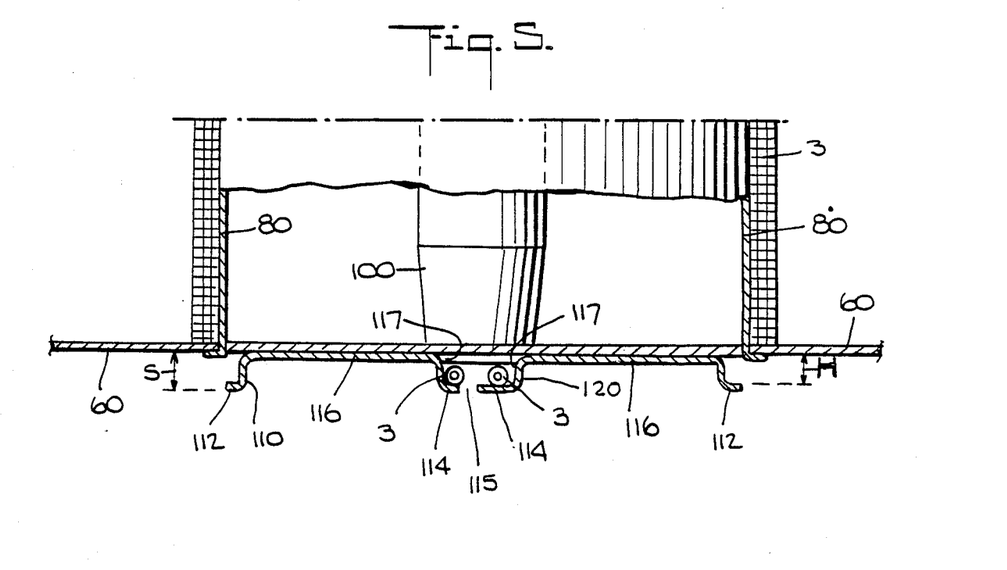
FIG. 5 is a cross-sectional view taken along lines 5—5 of FIG. 4.

FIG. 5 is a cross-sectional view through the plates 110 and 120 showing the recessed central portion 116 in greater detail. The zig-zag slot 115 between the sides 114 is sized for the particular cable being wound on the reel. Preferably, it is sized so that it is slightly larger than the diameter of the cable. The height H between the inside surface 114 of the plates 110 and 120 and the outside surface of flange 60 is preferably chosen to be just slightly larger than the diameter of the cable to be wound on the reel. However, the height H can also be designed to be slightly smaller than the cable diameter in order to provide a tight fit.

As shown in the drawing figures, flange 60 includes two notches 150 through which the cable traverses. As also shown in the drawing figures, if the reel is made of sheet metal, all sharp edges of the sheet material comprising the cable reel are suitably rounded, folded or crimped over (e.g. as shown at 131 and 151) so as to prevent cutting of the cable or injury to personnel handling the cable reel.

The use of the cable reel will now be explained. With reference to FIG. 3, a first end 18 is inserted through the aperture 130 in the flange 60. Aperture 130 is suitably sized so that it is at least as large as the width of the cable end connector plus the diameter of the cable insulating jacket itself. It may be made as large as twice the width of the cable end connector 18, or even larger, depending on the amount of cable to be retained in the hollow interior. Furthermore, aperture 130 may have other shapes, as convenient, as will be explained with reference to FIGS. 7 to 11 later. The cable is then routed through the zig-zag slot 115 between the two plates 110 and 120 and then moved against an inside surface 117 of the upstanding wall forming the recess 116 of one of the plates 110 or 120, for example, plate 120. See the leftmost cable in cross-section in FIG. 5 shown adjacent the wall section 117. The radius of curvature R of recess 116, as shown best in FIG. 4, is preferably made so that it is the minimum bending radius of the particular cable to be carried on the cable reel. This is an important specification for fiber optic cable, as fiber optic cable cannot be bent beyond a minimum bending radius if damage to the cable is to be avoided. The cable is then fed through the cut-out 150 in the flange 60 and wrapped around the drum member 80 of the cable reel. Once the entire cable is wound, the remaining end 18 is then passed through the other cut-out 150 in flange portion 60, as shown in greater detail in FIG. 6, and inserted into aperture 130 in flange 60. Prior to or after insertion of the remaining end 18 into aperture 130, the cable is routed through slot 115 and then disposed against wall surface 117 of recess 116 of the other plate member 120 so as to maintain the minimum bending radius of the cable.

Figure 6:
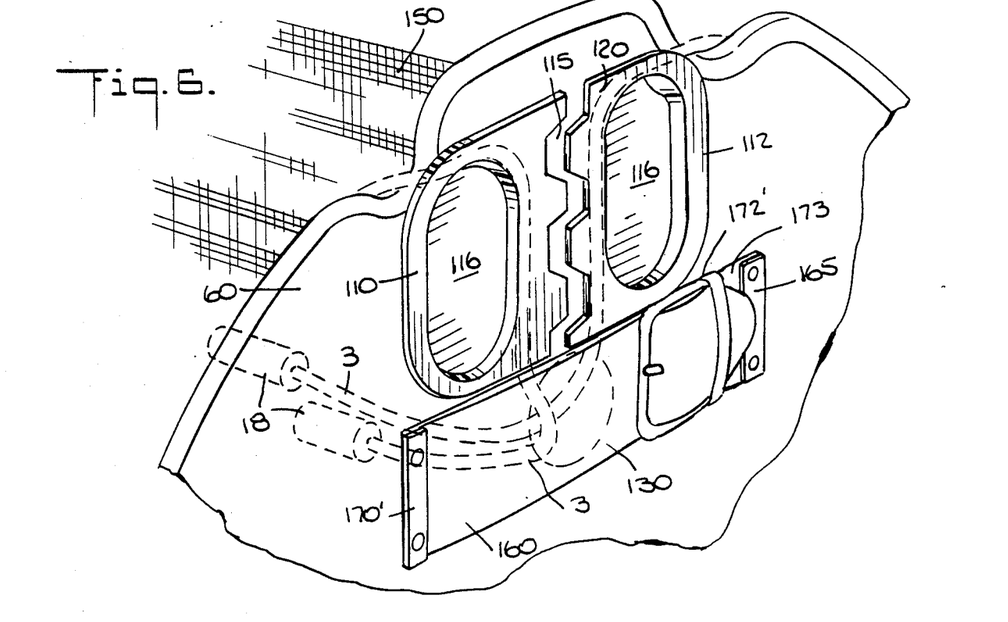
FIG. 6 is a perspective view of a modified embodiment of the portion shown in detail in FIG. 3.
Figure 7:
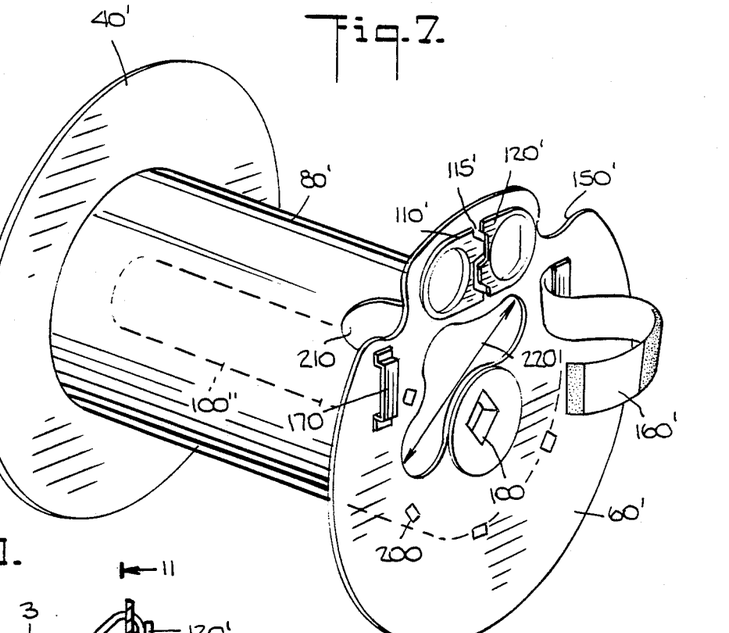
FIG. 7 is a perspective view of another embodiment of the cable reel according to the present invention.

As shown in the drawing figures, it is necessary to protect the exposed cable at the point where it enters into the hollow interior of cylindrical member 80 through aperture 130 in flange 60. According to one embodiment of the invention as shown in FIG. 3, the cable reel includes a strap member 160 which may be made of, for example, a suitable flexible material. Strap member 160 is riveted or fastened at one end 165 to flange 60 and at the other end is inserted through a bracket 170, and looped back on itself, with the end 172 comprising, for example, a Velcro fastening surface for attachment to a mating Velcro fastening surface 174 of strap member 160. Strap member 160 can be made entirely of such a Velcro surface. In an alternative embodiment, a strap 160' as shown in FIG. 6 may be utilized. Strap 160' is fastened to flange 60 by suitable means 170', and a corresponding buckle 172 is fastened, for example, via an additional strap 173 at 165' to the flange 60. Thus, the exposed portions of the cable fed through the aperture 130 are protected from contact with external forces. In order to prevent the end connectors 18 from moving about in the enclosed space between outer cylindrical member 80 and inner cylindrical member 100, a ledge or shelf 105, as best shown in FIG. 4 may be provided within the volume between members 80 and 100.

Furthermore, as shown in FIG. 2, suitable stacking dimples or members 180 may be disposed about flange 60 at equally spaced angular intervals, for example, three at 120°, so that the cable reels may be stacked one on top of the other. The height of each dimple or member 180 is such that it is at least equal to the external height S of the plates 110 and 120. See FIG. 5.

Thus, there has been provided a cable reel which is particularly adapted to the needs of the fiber optic cable industry. It is lightweight and efficient, saves the space wasted by the prior art cable reels having a dual flange, provides increased cable protection, is cheaper to manufacture and because of its use of spring type metal as a preferred material, is not easily deformable. Furthermore, the cable reel is easily stacked and provides an efficient design, since it utilizes the interior space of the cable drum to store the cable ends 18.

The cable reel according to the present invention preferably can be made in a variety of sizes to accommodate cables of different diameter. Thus, the dimensions can be varied according to the gauge of the particular cable. Furthermore, both flanges 40 and 60 can be provided with plates 110 and 120, apertures 130 and 150 and strap 160, if desired, so that the cable can be wound about the reel starting at either flange.

FIGS. 7 through 11 show a further embodiment of the cable reel according to the present invention. As shown in these figures, the modified cable reel includes flanges 40' and 60' coupled together by an outer cylindrical member 80' and an inner cylindrical member 100''. These members may all be fastened together by suitable means, as for example, by spot welding or by tabs 200 engaging slots of the respective flanges 40' and 60' as shown. Flange 60' includes at least one aperture 150' disposed along the periphery of the flange through which the cable can be traversed, as in the embodiment shown in FIGS. 2 through 6. Similarly, flange 60 also includes plates 110' and 120' defining a zig-zag slot 115' between opposed sides of the plates. Plates 110' and 120' may be suitably fastened to the flange 60', as for example by spot welding, rivets or screws.

In contrast to the embodiment of FIGS. 2 through 6, the embodiment of FIGS. 7 through 11 includes a larger aperture 130' disposed adjacent the center of the flange 60'. This aperture 130' is elongate, and in particular, approximately triangle shaped, with the triangle corners being comfortably rounded so as to receive the cable ends and connectors easily. In addition, drum member 80' also includes a preferably elongate aperture 210 disposed adjacent and merging into aperture 130'.

Figures 8, 9:
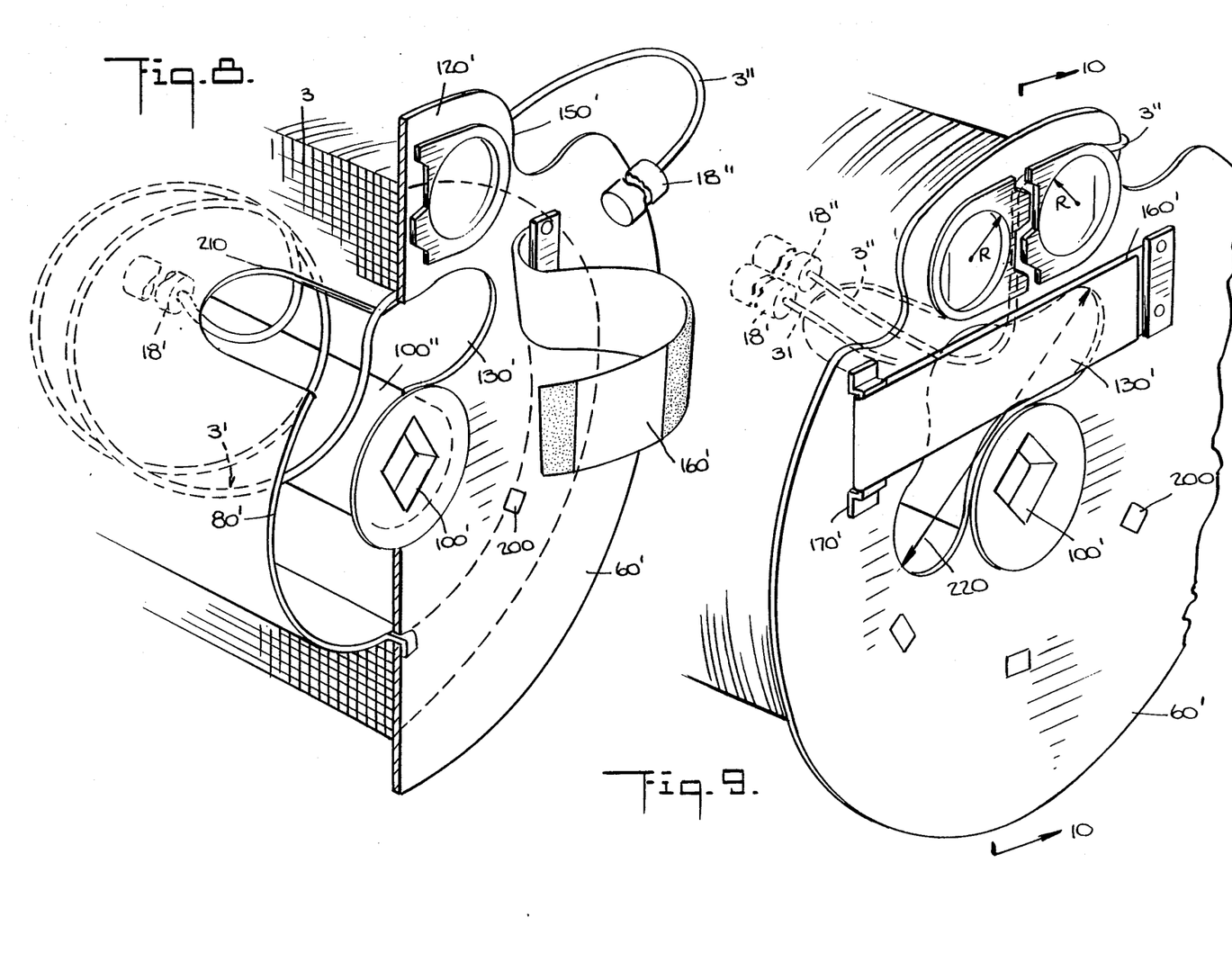
FIG. 8 is a detailed cross sectional perspective view of a portion of the cable reel shown in FIG. 7 showing one end of the cable wound on the reel disposed in the interior of the cable reel drum and the other end prior to insertion into the interior of the drum.
FIG. 9 is a further detailed perspective view of a portion of the cable reel shown in FIG. 7 with both cable ends in the interior of the cable reel drum.
Figure 10:
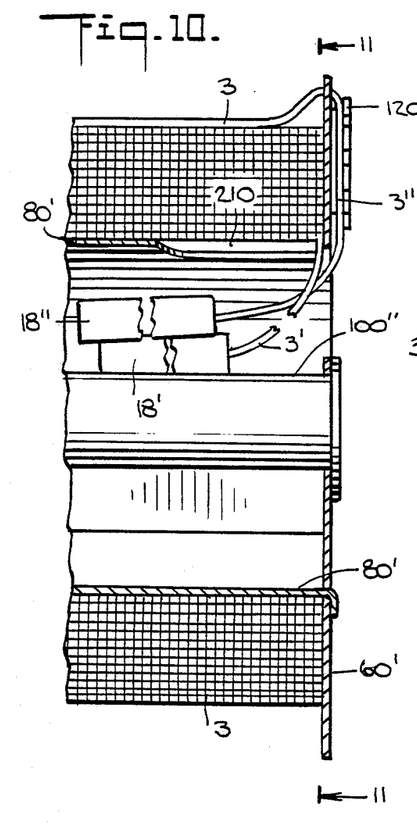
FIG. 10 is a cross-sectional view of the cable reel through line 10—10 of FIG. 9.

The purpose of elongate aperture 130' and aperture 210 is as follows. As shown most clearly in FIG. 8, a first cable end 3' along with connector 18' is inserted through aperture 210 in cylindrical drum member 80', prior to winding of the cable 3 on the drum member, into the hollow interior of the drum member. In contrast with the embodiment shown in FIGS. 2 through 6, first cable end 3' need not traverse an aperture 150', zig-zag slot 115' or aperture 130' before being inserted into the hollow interior of the drum member. The reason for this is so that upon winding of the cable 3 around drum member 80', the length of cable which would otherwise be disposed (in the embodiment of FIGS. 2 to 6) adjacent the inner surface of flange 60' before it traverses an aperture 150' will not interfere with the winding process. Thus, after the cable end 3' and connector 18' are inserted into t he aperture 210, the cable is wound, preferably by automatic winding machinery around the cylindrical drum member 80'. Once the winding process is complete, connector 18" is attached to the remaining end 3" of the cable which is then routed through an aperture 150' in the flange 60'. The cable end 3" is then routed through zig-zag slot 115' between plates 110' and 120' and connector 18" and cable end 3" ar then fed through aperture 130' into the drum interior. A protective strap 160' may be employed similarly as in the embodiment of FIGS. 2 through 6 in order to protect the end of the cable 3" in the area of the aperture 130'. A bracket 170' may be employed for fastening the strap 160' and the strap 100' may be made of a material employing a hook and loop fastener such as VELCRO. FIG. 9 shows the cable reel after the winding process has been completed with the protective strap 160' in place.

Flange 60' may be produced with two apertures 150', so that cable 3 wound on the reel may be wound in either direction, i.e., clockwise or counterclockwise. Depending upon the direction of winding, either aperture 150' may be selected for routing the remaining end of the cable to the aperture 130'.

Aperture 130' is made enlarged compared to the embodiment of FIGS. 2 through 6 so that a relatively large amount of cable 3, along with the connectors 18' and/or 18" may be inserted through the opening. In particular, it is generally desirable to have about 15 feet of free cable coiled in the interior of the drum member so that an adequate amount of free cable will be available for testing purposes. The coil of free cable is inserted into the hollow interior of the drum member through elongate aperture 210 so that it can later be removed through the aperture 130' such that the plane of the coil extends along line 220 shown in FIG. 7. Alternatively, the free cable can be inserted first through aperture 210 and then through aperture 130' toward the outside of the cable reel where it can be conveniently coiled and then reinserted through aperture 130' into the drum interior with the plane of the coil lying along line 220. The coil of free cable is shown most clearly in FIGS. 8 and 11. In the other figures, this coil has been omitted for purposes of clarity. The other end 3" of the cable can similarly be coiled in the hollow interior, but such a second coil is not as important because a sufficient length of cable can easily be unwound from the cable wound on drum member 80' for testing purposes.

As is evident, the cable reel of FIGS. 7 through 11 may also be used in the same way as the cable reel of FIGS. 2 through 6, i.e., both ends 3' and 3" of the cable 3 may be routed through a respective aperture 150' in the periphery of flange 60' and then through aperture 130' into the hollow interior of the drum member 80'.

Figure 11:
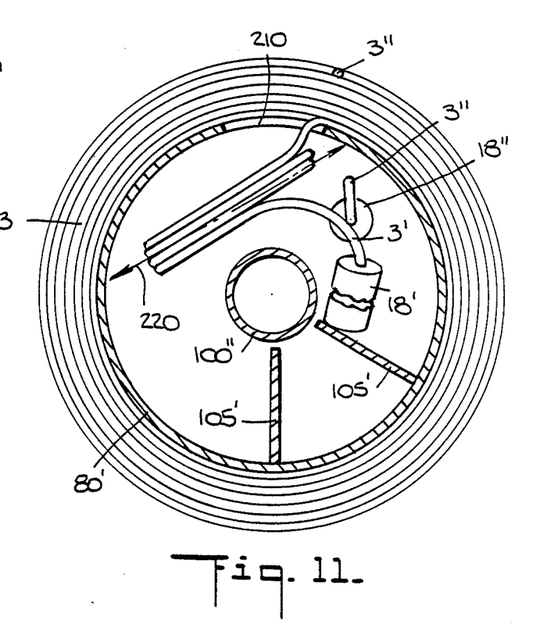
FIG. 11 is a cross sectional view of the cable reel through line 11—11 of FIG. 10.

As shown most clearly in FIG. 11, in order to provide for additional room for the cable end connectors, two shelf portions 105' may be disposed in the hollow interior of drum member 80', with the two shelf members 105' defining an angular segment of a circle therebetween, which angular segment may be less than 90°.

The embodiment shown in FIGS. 7 through 11 has the advantage that it allows a larger amount of free cable to be stored conveniently within the hollow interior of cylindrical member 80' and furthermore allows the first end of the cable 3' prior to winding of the cable on the drum 80' to be inserted into the hollow interior of the drum member 80' through an aperture 210 disposed in the drum member, thus preventing interference of the first end 3' of the cable with the winding process. Alternatively, both ends of the cable may traverse a respective peripheral aperture 150' in the flange 60', then be routed through the zig-zag slot 115' before being inserted through the central aperture 130' into the hollow interior of the drum member 80', as in the earlier discussed embodiment.

Thus, the cable reel in the embodiment of FIGS. 7 to 11 can be used precisely like the embodiment of FIGS. 2 to 6 or it may be used such that the first end of the cable is fed through aperture 210 into the hollow drum interior and the second end is fed through aperture 130' after traversing an aperture 150' and zig-zag slot 115'.

In all other respects, the cable reel of FIGS. 7 to 11 is substantially the same as the cable reel of FIGS. 2 to 6, and provides the same advantages in protecting the cable and cable ends.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A cable reel comprising:
   a first cylindrical member about which cable can be wound having a longitudinal axis and a hollow interior;
   first and second flanges disposed at opposite ends of said cylindrical member substantially at right angles to the longitudinal axis of said cylindrical member, one of said flanges having an outside surface having at least one opening arranged adjacent the periphery of said one flange through which the cable can be traversed and a second opening in the surface disposed adjacent the center of said one flange and opening into the hollow interior of the cylindrical member, said hollow interior adapted to receive ends of the cable wound on said cylindrical member, at least one end being received through the second opening, and further comprising means disposed on the outside surface for protecting the cable extending between the first opening and the second opening.

2. The cable reel recited in claim 1, wherein said cylindrical member further has an opening disposed therein opening into the hollow interior for allowing one end of the cable to be received through the opening of the cylindrical member into the hollow interior.

3. The cable reel recited in claim 2, wherein said opening in said cylindrical member is disposed adjacent and merges into said second opening.

4. The cable reel recited in claim 2, wherein said second opening is elongate.

5. The cable reel recited in claim 4, wherein said second opening is triangle shaped with rounded corners.

6. The cable reel recited in claim 1, wherein said means for protecting comprises a wall disposed adjacent and parallel to the outside surface of said one flange and at a spacing from the surface of said one flange equal to at least approximately the thickness of said cable, for receiving the cable between the surface and the wall, thereby protecting said cable extending between said first and second openings.

7. The cable reel recited in claim 6, wherein said means for protectig comprises a plate having a central recessed portion attached to the outside surface of said one flange and an edge portion comprising said wall disposed at a height at least approximately equal to the thickness of the cable, said edge being paralled to said outside surface of said one flange.

8. The cable reel recited in claim 7, further comprising a second plate having a central recessed portion attached to the outside surface of said one flange and an edge portion forming a further wall disposed at a height at least approximately equal to the thickness of the cable, said edge of said second plate being parallel to said outside surface of said one flange, said two plates being disposed adjacent each other with a slot between said edges of said plates having a thickness equal to at least the thickness of said cable.

9. The cable reel recited in claim 8, wherein said slot comprises a zig-zag slot adapted to receive said cable.

10. The cable reel recited in claim 1, further comprising additional means for protecting said cable and being attached to said one flange, said additional means being provided for protecting said cable in the area between said means for protecting and said second opening.

11. The cable reel recited in claim 10, wherein said additional means comprises strap means extending across said area.

12. The cable reel recited in claim 6, wherein said means for protecting prevents said cable from bending beyond a minimum bending radius of the cable.

13. The cable reel recited in claim 6, wherein said recessed portion of said plate has a curved upstanding wall for receiving said cable thereagainst, said curved wall having a radius of curvature substantially equal to the minimum bending radius of the cable.

14. The cable reel recited in claim 1, wherein said first opening comprises a cut-out disposed at a peripheral edge of said one flange.

15. The cable reel recited in claim 14, wherein said one flange has two of said first openings arranged adjacent the periphery of said one flange, thereby allowing said cable to be wound in either a clockwise or counter-clockwise direction on said first cylindrical member.

16. A cable reel comprising:
   a first cylindrical member about which cable can be wound having a longitudinal axis and a hollow interior;
   first and second flanges disposed at opposite ends of said cylindrical member substantially at right angles to the longitudinal axis of said cylindrical member, one of said flanges having an outside surface having at least one opening arranged adjacent the periphery of said one flange through which the cable can be traversed and a second opening in the surface disposed adjacent the center of said one flange and opening into the hollow interior of the cylindrical member, said hollow interior adapted to receive ends of the cable wound on said cylindrical member, at least one end being received through the second opening, and further comprising means attached to said one flange having a wall disposed adjacent and parallel to the outside surface of said one flange and at a spacing from the surface of said one flange equal to at least approximately the thickness of said cable, for receiving the cable between the surface and the wall, thereby protecting said cable extending between said first and second openings, said cylindrical member further having an opening disposed therein opening into the hollow interior for allowing one end of the cable to be received through the opening of the cylindrical member into the hollow interior.

17. The cable reel recited in claim 16, wherein said second opening comprises an elongate opening for allowing a coil of free cable to be inserted therethrough.

18. The cable reel recited in claim 17, wherein said second opening is an approximately triangle shaped opening having rounded corners.

19. The cable reel recited in claim 16, wherein said opening in said cylindrical member is disposed adjacent and merges into said second opening.

20. The cable reel recited in claim 19, wherein said opening in said cylindrical member is elongate.

21. The cable reel recited in claim 16, wherein said means for protecting comprises a plate having a central recessed portion attached to the outside surface of said one flange and an edge portion comprising said wall disposed at a height at least approximately equal to the thickness of the cable, said edge being parallel to said outside surface of said one flange.

22. The cable reel recited in claim 21, further comprising a second plate having a central recessed portion attached to the outside surface of said one flange and an edge portion forming a further wall disposed at a height at least approximately equal to the thickness of the cable, said edge of said second plate being parallel to said outside surface of said one flange, said two plates being disposed adjacent each other with a slot between said edges of said plates having a thickness equal to at least the thickness of said cable.

23. The cable reel recited in claim 22, wherein said slot comprises a zig-zag slot adapted to receive said cable.

24. The cable reel recited in claim 23, wherein said plates are identical but rotated 180° with respect to each other.

25. The cable reel recited in claim 16, wherein said drum member and flanges comprise sheet metal.

26. The cable reel recited in claim 25, wherein said flanges comprise spring type metal.

27. The cable reel recited in claim 16, wherein said drum member and flanges comprise a plastic material.

28. The cable reel recited in claim 16, further comprising a shelf disposed in said hollow interior for supporting the ends of the cable in said hollow interior.

29. The cable reel recited in claim 28, wherein said shelf comprises two shelf portions forming an angle therebetween of less than 90°.

30. The cable reel recited in claim 16, further comprising an interior cylindrical member disposed inside and concentric with said first cylindrical member.

31. The cable reel recited in claim 16, further comprising additional means for protecting said cable and being attached to said one flange, said additional means being provided for protecting said cable in the area between said means for protecting and said second opening.

32. The cable reel recited in claim 31, wherein said additional means comprises strap means extending across said area.

33. The cable reel recited in claim 32, wherein said strap means is attached at one end thereof to the outside surface of said one flange at one side of said area and extends through a bracket disposed on said outside surface of said one flange at an opposite side of said area and thereafter loops back and is fastened on itself.

34. The cable reel recited in claim 32, wherein said strap means comprises a belt and buckle.

35. The cable reel recited in claim 16, further comprising stacking means disposed on the outside surface of said one flange.

36. The cable reel recited in claim 35, wherein said stacking means are spaced equiangularly about said flange.

37. The cable reel recited in claim 16, wherein said means for protecting prevents said cable from bending beyond a minimum bending radius of the cable.

38. The cable reel recited in claim 21, wherein said recessed portion of said plate has a curved upstanding wall for receiving said cable thereagainst, said curved wall having a radius of curvature substantially equal to the minimum bending radius of the cable.

39. The cable reel recited in claim 37, wherein said cable reel is particularly adapted for the storage of fiber optic cable.

40. The cable reel recited in claim 16, wherein said first opening comprises a cut-out disposed at a peripheral edge of said one flange.

41. The cable reel recited in claim 16, wherein said hollow interior is adapted to receive connectors coupled to the ends of the cable.

42. The cable reel recited in claim 40, wherein said one flange has two of said first openings arranged adjacent the periphery of said one flange, thereby allowing said cable to be wound in either a clockwise or counterclockwise direction on said first cylindrical member.

* * * * *